United States Patent [19]
Ahlrot

[11] 3,955,834
[45] May 11, 1976

[54] APPARATUS FOR CONNECTING DUCTS WITH A SELF-SEALING JOINT

[75] Inventor: Ake Ahlrot, Jonkoping, Sweden

[73] Assignee: Aktiebolaget Svenska Flaktfabriken, Nacka, Sweden

[22] Filed: Feb. 21, 1975

[21] Appl. No.: 551,555

Related U.S. Application Data

[63] Continuation-in-part of Ser. No. 328,399, Jan. 31, 1973, abandoned.

[30] Foreign Application Priority Data

Feb. 11, 1972 Sweden.............................. 1688/72

[52] U.S. Cl................................ 285/110; 285/345; 285/370; 285/379
[51] Int. Cl.² ................................... F16L 21/02
[58] Field of Search .......... 285/370, 371, 110, 109, 285/379, 380, 424, 231, 230, 345; 277/189, 178, DIG. 2

[56] References Cited
UNITED STATES PATENTS

| | | | |
|---|---|---|---|
| 1,819,007 | 8/1931 | Smith................................. | 285/110 |
| 1,924,020 | 8/1933 | Bihet............................. | 285/345 X |

FOREIGN PATENTS OR APPLICATIONS

| | | | |
|---|---|---|---|
| 1,168,040 | 10/1969 | United Kingdom................ | 285/231 |
| 75,978 | 6/1953 | Denmark......................... | 285/110 |
| 980,901 | 1/1962 | United Kingdom................ | 285/110 |

*Primary Examiner*—Thomas F. Callaghan
*Attorney, Agent, or Firm*—Dorfman, Herrell and Skillman

[57] ABSTRACT

A duct-connecting joint of tubular cylindrical form adapted to be telescopically engaged within the free end of a cylindrical duct having an L-shaped sealing element extending about its circumference with a base portion flush against the cylindrical wall of the connecting body and a radial flange portion biased to extend at an angle greater than 90° to the base portion. The base portion is mounted within an inset zone of the connecting body so that the connecting body itself provides cylindrical guide portions on opposite sides of the sealing flange which may engage against the interior cylindrical surface of the duct to prevent destruction of the flange. Several methods are shown for fabricating the connecting body to insure that the flange is biased outward to rest at an angle of greater than 90° with the base.

14 Claims, 23 Drawing Figures

APPARATUS FOR CONNECTING DUCTS WITH A SELF-SEALING JOINT

The present application is a continuation-in-part of my earlier application Ser. No. 328,399 filed Jan. 31, 1973 (now abandoned).

The present invention relates to ductwork for ventilation and airconditioning systems, and has particular application to means for making the connection at the free ends of the runs of cylindrical duct members.

Prior to the present invention, the conventional mode of assembling ductwork is airconditioning and ventilating systems consisted in the use of cemented joints for joints with expanding packings. Such prior methods of making connections were not entirely satisfactory because of the labor required to perform the sealing of the joint on one end, and the necessity for applying pressure to the system to test the joints for leakage on the other hand. Furthermore, such prior art methods increased the likelihood of leaky joints when the elements of the joint were exposed to harsh atmospheric conditions, such as the existence of moisture, ice or frost on the elements.

The present invention provides a novel connection which not only is simple and effective to manufacture and assemble, but also is sufficiently positive in sealing operation to avoid the necessity for testing the joint other than by a visual inspection of the joint itself. Thus, the joint may be assembled and visually inspected without the need for awaiting completion of the system for pressure testing. Furthermore, the particular arrangement of the connecting means of the present invention permits adjustment of the connecting pieces to accommodate the joint to installation tolerances. The connection of the present invention is suitable for connecting cylindrical ducts having external seams or other irregularities on the outer surface without loss of effectiveness. Furthermore, the joints may be made in sizes to accommodate the smallest of ducts, as well as sizes to accommodate the largest ducts.

With the foregoing in mind, the present invention provides an improved duct connection wherein the connecting body is adapted to be telescopically engaged within the free end of a cylindrical duct run, the connecting body having an improved sealing arrangement disposed circumferentially thereof to provide an effectively tight joint.

In particular, the present invention provides a connecting body of generally cylindrical form for telescopic engagement within the free end of a tubular duct run, wherein the connecting body of sheet metal form as a pair of cylindrical guide portions spaced axially for engagement with the interior surface of the duct run and an L-shaped sealing element having a base portion circumscribing the element and disposed axially thereof and a radial flange portion, the assembly including means at the junction of the flange and base portion to bias the flange portion outwardly into an angular relationship of greater than 90° with the base portion, said flange, when the connecting body is engaged within the open end of the tubular run being deflected inwardly against such bias to lie at a greater obtuse angle with said base portion, the flange is disposed intermediate said cylindrical guide portions of the tubular connecting body so that said bias maintains said flange portion in continuous sealing engagement with the interior surface of said open end of the tubular run.

In accordance with another feature of the present invention, the base portion of the sealing element is encircled by a sheet metal clamping strip portion which cooperates with said biasing means to normally dispose said flange at an angle of greater than 90° to said base portion, it being preferred to provide a circumferential rib or bead on the base portion to engage an abutment edge which positions said sealing flange properly in relationship with said clamping portion intermediate said guide portions of the connecting body.

These and other objects of the invention are more fully set forth hereinafter with reference to the accompanying drawing, wherein.

Figure 1:
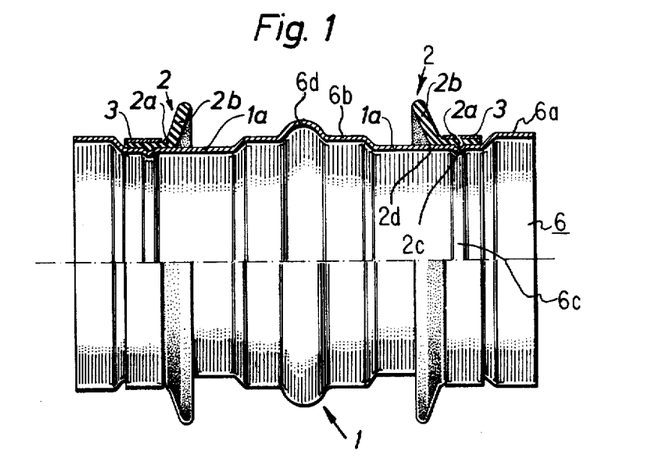
FIG. 1 is a view of a connecting body made in accordance with the present invention, the view being in side elevation and partly in section.
Figure 2:
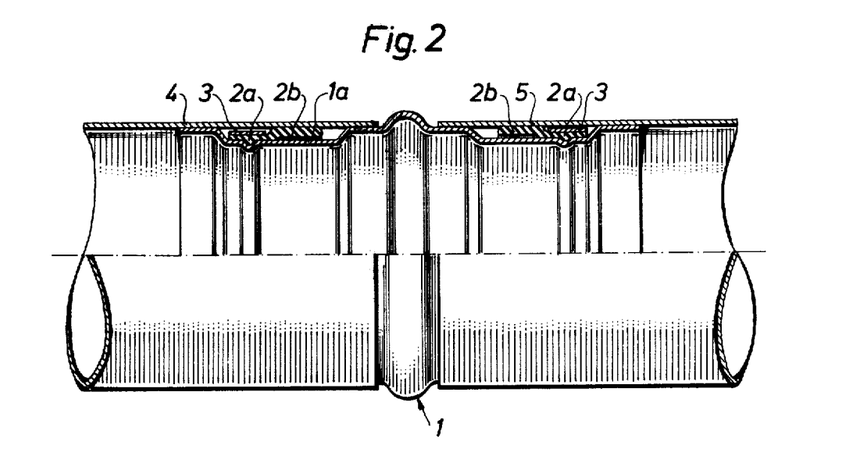
FIG. 2 is a view similar to FIG. 1 showing the connecting body in the position connecting the open ends of two duct runs.

Referring now to FIGS. 1 and 2, the connecting member of the present invention is identified by the general reference character 1. The member consists of a tubular body portion 6 of sheet metal or the like and a pair of sealing elements 2,2 each of which consists of an L-shaped member having a base portion 2a and a flange portion 2b. The base portion 2a circumscribes the tubular element 6 and extends axially thereof as shown in FIG. 1 and flange element 2b normally projects radially from the axial base portion, as shown in FIG. 1. The sealing element 2 is retained in proper position on the tubular member 6 by a clamping strip 3 in conjunction with a bead 2c on the underside of the base portion 2a, which engages in a circumferential groove 6c in the tubular element 6. The circumferential groove 6c provides an abutment means which engages the bead 2c and properly positions the sealing element 2 against axial displacement when the element 2 is clamped in place by the clamping strip 3.

The tubular element 6 has an inset zone as indicated at 1a to accommodate the base portion 2a and also the flange portion 2b when the latter portion of the sealing element is displaced by engagement of the open ends 4 and 5 of the duct runs over the connecting piece 6, as shown in FIG. 2. On either side of the inset zone 1a, the tubular element 6 is formed with an outer cylindrical guide portion 6a and an inner cylindrical guide portion 6b. The inner guide portion 6b on opposite ends of the tubular connecting piece 6 are separated by a protruding central portion 6d. The guide portions 6a and 6b provide guiding surfaces for engaging with the smooth interior cylindrical surface of the respective tubular duct ends 4 and 5, as shown in FIG. 2.

In accordance with a primary feature of the present invention, the assembly of the sealing rings 2 with the tubular body element 6 provides a reinforcing bias tending to position the outer faces of the flange portions 2b of the connecting piece at an angle of slightly greater than 90° with the base portions 2a. To this end, the flange portion 2b and the base portion 2a of the element 2 meet at an obtuse angle, and the sealing element 2 at the outside corner of the angle formed by the flange and body portions constitutes an external peak 2d in the form of a sharp angular junction between the inner surfaces of the flange portion 2b and the base portion 2a. When the straight cylindrical undersurface of the base 2a is seated firmly on the cylindrical outersurface of the inset zone 1a by means of the clamping strip 3, this sharp angular form at the junction of the flange with the base portion serves as a supplemental bias means which tends to maintain the flange portion 2 b in its slightly obtuse angular position shown in FIG. 1. Thus, when the pipe ends 4 and 5 are forced over the guide portion 6a into engagement with the flange portion 2b, the bias provided by the structure resists the further displacement of the flange portion and maintains a firm sealing engagement of the flange portion with the interior cylindrical surface of the duct end portions. The resistance is not so great as to prevent further displacement of the tubular end portions 4 and 5 into engagement with the inner guide surface 6b so that these surfaces guide the ultimate free ends of the duct portions 4 and 5 and prevent damage to the flange element 6b when the assembly is subjected to the normal vibrations of a ventilating or airconditioning operation. Thus, when the joint is properly assembled, visual inspection reveals engagement of the end portions of the duct runs 4 and 5 with the inner guide portion 6b and when so engaged, the joint is self-sealing. The sealing flexibility of the flange portion 2b with the interior surface of the ends 4 and 5 permits rotary movement of the cylindrical duct run on the connecting piece without destroying the sealing effect.

Figures 3, 4, 10:
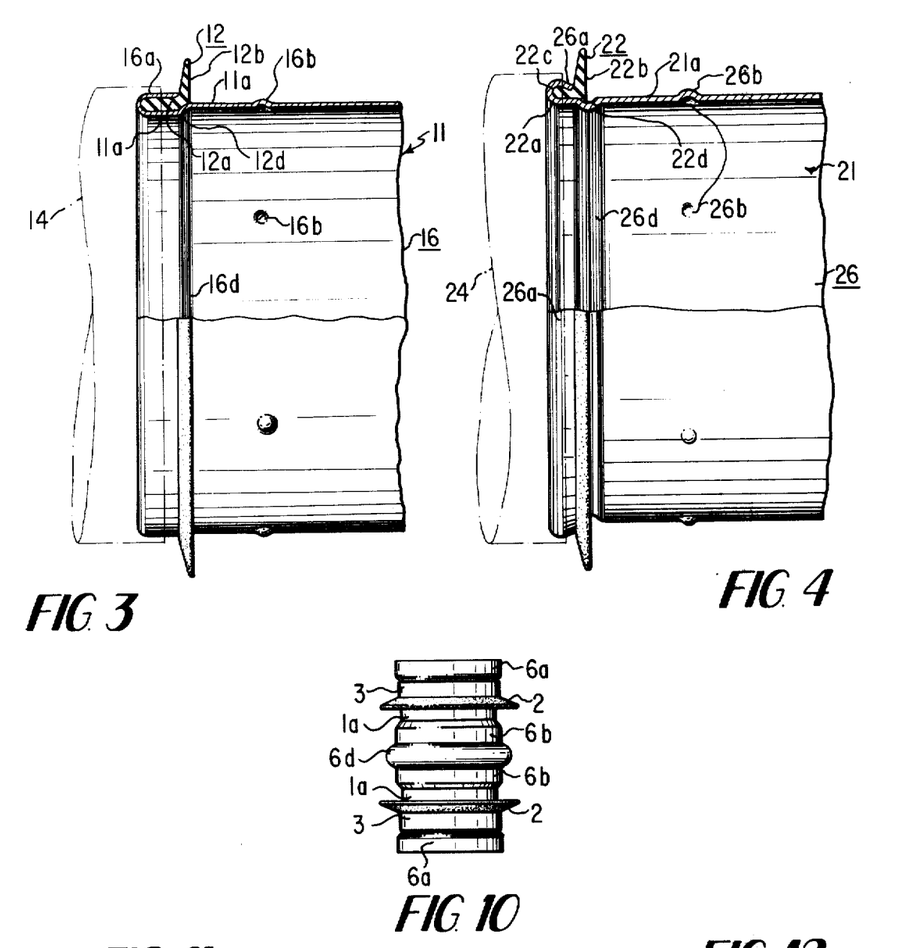
FIG. 3 is a fragmentary view of another embodiment of the connecting body partially in elevation and partially in section, with the end of the duct run shown in broken lines.
FIG. 4 is a view similar to FIG. 3 of a further embodiment of the present invention.
FIGS. 10, 11 and 12 are thumbnail views of different forms of connecting bodies embodying the present invention.

In FIG. 3, a variation in the joint is illustrated. In this figure, one end of a connecting member 11 is illustrated, the member comprising a tubular body portion 16 having a sealing element 12 mounted thereon. The sealing element 12 comprises a base portion 12a and a flange portion 12b disposed at substantially right angles to the base portion 12a. The flange 12b is tapered to position the outer face at an obtuse angle with the base 12a. In this embodiment of the invention, the outer guide portion of the tubular body 16 consists of a turned-back flange 16a which overlies the inset zone 11a of the tubular body portion. Spaced axially inward from the outer guide portion 16a is a series of dimples or warts 16b disposed circumferentially of the body portion 16 and cooperating to define a generally cylindrical guide surface. The flange 12b of the sealing element 12 is positioned between guide surfaces 16a and 16b so that when the flange is displaced from its normal radial position to a greater obtuse angle with the base portion, it lies between the portions 16a and 16b.

In the present form of self-sealing connection, the base portion 12b of the sealing element 12 is anchored against axial displacement on the inset zone 11a by means of an abutment shoulder 16d which bears agaisnt the sealing element at the junction between the flange 12b and the body portion 12a. This abutment shoulder 16d serves also the function of providing an additional bias against the sealing element at the outer corner of the junction between the flange 12b and the base 12a and cooperates with the back-turned lip 16a to bias the flange 12b into the upright position shown in FIG. 3. The reverse bend at 16c abuts the outer end of the base 12a so that the lip 16a is properly positioned at the inside corner between the flange 12b and the base 12a. In this fashion, the abutment 16d, bearing against the outside corner 12d between the flange 12b and the base 12a, biases the flange toward the upright position shown in FIG. 3.

As is apparent, the end portion 14 of the open-ended duct run, when telescopically engaged over the end of the connection 11, passes over the outer guide portion 16a and deflects the flange 12b against the bias provided in this manner to cause the flange to lie at a greater obtuse angle to the base portion 12a whereupon further displacement of the end 14 causes it to overlie the inner guide surface provided by the series of projections 16b. The projecting inner guide portion provided by the projections 16b thereby prevents the duct end from pinching the deflected flange 12b against the inset zone 11a to an extent which would destroy the sealing function.

A similar connection is shown at 21 in FIG. 4. In this embodiment, a tubular body portion 26 mounts a sealing element 22 extending about the circumference of the element 26 having an axial base portion 22a and a radial flange portion 22b. In this form of connection, the end lip of the tubular element 26 is turned back on itself to form an arcuate outer guide surface 26a which cooperates with an outwardly facing arcuate bead 22c on the base portion to anchor the sealing element 22 against axial displacement. The arcuate surface 26a also functions as an outer guide surface and cooperates with an inner guide portion formed by a series of warts 26b comparable to the warts 16b of the previously described embodiment.

In this form of connection, additional bias for urging the flange 22b into the radial position shown is provided by the sharp angular outside corner 22d between the inwardly-facing surfaces of the flange 22b and the base portion 22a. The combined clamping and abutment action of the back-turned lip 26a at the free end of the element 26 firmly anchors the sealing element 22 against axial displacement. It should be noted that the straight cylindrical wall of the inset zone 21a, which extends from the warts 26b to the base of the lip 26a, provides a firm seat for the straight cylindrical undersurface of the base 22a. To reduce the resistance to flexure of the flange 22b and to permit the flange more readily to assume an obtuse angle with the base portion 22a, a circumferential groove 26d is provided in the cylindrical inset portion 21a to underlie the biasing corner 22d. Thus, the thickness of the sealing element provided by the sharp angular corner 22d serves the prime function of biasing the flange 22b against the end 24 of the duct run being engaged over the connecting piece.

Figure 5:
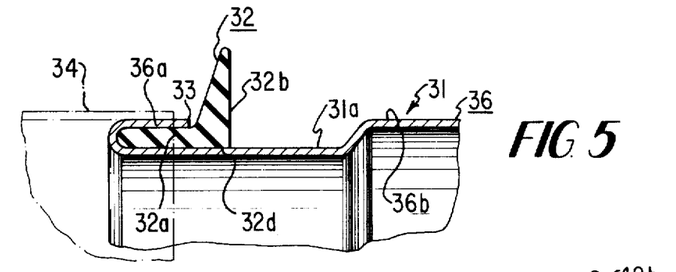
FIGS. 5, 6 and 7 are fragmentary views in section showing still further embodiments of the present invention with the end of the duct run shown in broken lines prior to assembly.

In FIG. 5, the sealing arrangement of the joint 31 is similar to that of FIG. 1. The joint comprises a tubular body element 36 and a circumferential seal 32 having a base portion 32a and a flange 32b. The base portion circumscribes the tubular element 36 in an inset zone 31a disposed between the outer guide portion 36a and the inner cylindrical guide portion 36b. The outer guide portion 32a is formed by the back-or reversely-turned lip of the tubular member 36 which serves the additional function of clamping the base portion 32a against the inset zone 31a. The free end of the turned-back portion at 33 provides an abutment against which the flange 32b may bear. In this embodiment, the flange 32b and the base portion 32a meet with a sharp angular corner at 32d which functions in cooperation with the straight-wall cylindrical surfaces and the abutment 33 to reinforce the bias of the flange 32b toward its obtuse radial position. The bias provided by the sharp outside corner 32d insures that the duct end 34, when engaged over the connecting piece 31, will maintain sealing engagement with the flange 32b when the free end of the duct portion 34 engages over the inner cylindrical guide surface 36b.

Figure 6:
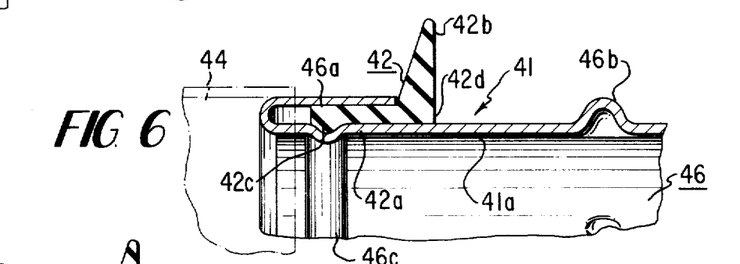

FIG. 6 illustrates a further embodiment of a joint 41 in which a tubular member 46 mounts a sealing element 42 having a base portion 42a and a flange portion 42b. The base portion 42a is anchored on an inset zone 41a so that the flange is disposed between the reversely-turned end 46a of the tubular member and the inner guide portion formed by a series of warts 46b. In this embodiment of the connection, the base portion 42a is provided with a bead 42c on its undersurface which engages in a groove 46c in the inset zone 41a. The back-turned end 46a cooperates with the abutment provided by the groove 46c to anchor the sealing element 42 against axial displacement. In this form of the invention, the flange 42b meets the base portion 42c in a sharp outside corner at 42d which, like the previously described embodiments of FIGS. 1, 4 and 5, cooperate with the end of the back-turned clamping lip 46a to provide a bias tending to maintain the flange extending radially from the base portion 42a.

Figure 7:
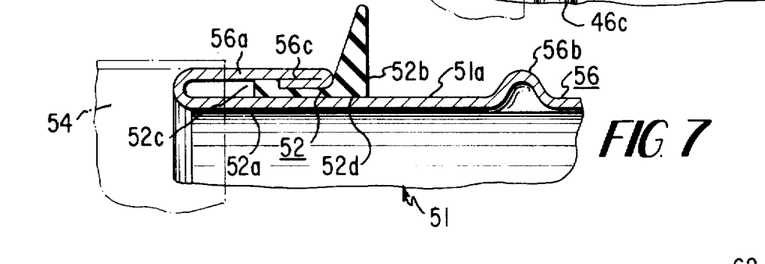

FIG. 7 shows a joint 51 which is similar to the joint 41 and comprises tubular member 56 having an outer guiding portion 56a provided by the reversely-turned end of the tubular member 56. An inner guiding surface is provided by a series of warts 56b. Between the guiding portions 56a and 56b, an inset zone 51a has a straight-walled cylindrical surface against which the sealing element 52 is positioned with its base portion 52a flush against the inset zone 51a and the flange portion 52a biased outwardly therefrom. The base portion 52a has a beat at its outer end as shown at 52c, in the present instance on the outside surface of the base portion 52a. The bead 52c cooperates with an abutment on the underside of the portion 56a to anchor the sealing element 52 against axial displacement. The abutment 56c on the undersurface of the portion 56a is provided by a reversely-turned lip at the inner end of the portion 56a. The portions 56a and 56c cooperate with the base portion 52a to retain the sealing element in proper position relative to the portion 56a to bias the flange to the obtuse radial position shown. As in the previous embodiment, the junction between the flange 52b and the base portion 52a is characterized by a sharp angular corner at 52d which provides a biasing force tending to maintain the flange 52b in its position relative to the base portion 52a. When the end 54 of the tubular duct run is telescopically engaged to span over the portions 56a and 56b, the bias provided by the sharp corner 52d resists flexure of the flange and maintains a tightly-sealed connection between the flange and the interior surface of the end 54.

Figure 8:
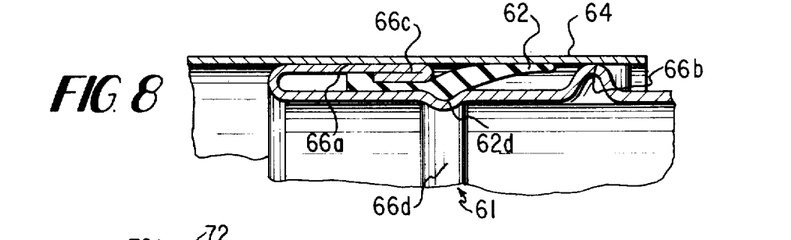
FIG. 8 is a fragmentary view in section of a still further embodiment of the present invention showing the end of the duct run in full lines assembled to the connecting body.

In the embodiment of FIG. 7, the inset zone 51a of the tubular element 56 is straight where it underlies the corner 52d. If it is desired to reduce the bias provided by this sharp angular corner 52d, the joint may be modified as shown in FIG. 8. To this end, the joint 61 is similar to the joint 51 except that a groove 66d underlies the corner 62d to receive this corner when the tubular end 64 of the duct run is engaged as shown in the figure. The element in this embodiment provides cylindrical guide portions at 66a and 66b as in the previously described embodiments, and the sealing element 62 is comparable in all respects to the sealing element 52 described previously so that it may engage with the reversely-turned lip 66c on the underside of the portion 66a.

Figure 9:
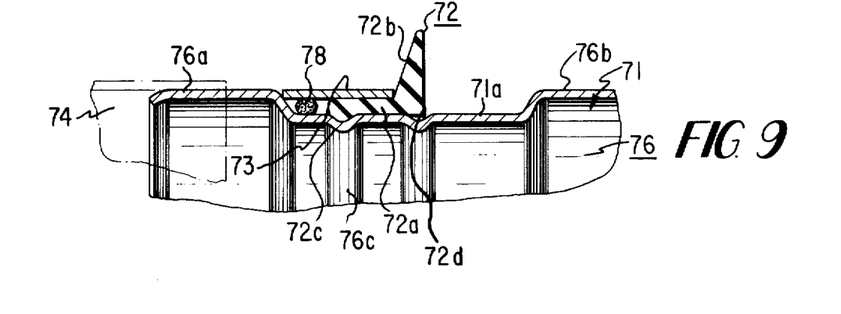
FIG. 9 is a view similar to FIGS. 5 through 7 showing an embodiment of the invention which is particularly well adapted for use with ducts of large diameter, for example ducts in the range of 1.25 to 1.50 meters.

A still further form of joint is shown in FIG. 9 at 71. The connection 71 is similar to the connection shown in FIGS. 1 and 2 in that it comprises a tubular connecting element 76 having axially spaced guide portions 76a and 76b. A sealing element 72 is mounted on the inset zone 71a of the tubular member 76 so that its base portion 72a has a bead 72c engaging in a recess 76c providing an abutment for anchoring the base against axial displacement. The flange 72b meets the base 72a with a sharp outside angle at 72d to provide supplemental bias for urging the flange 72d into the obtuse radial position shown. The base portion 72a is retained in engagement by a clamping strip 73 which cooperates with the groove 76c to firmly anchor the sealing element in proper place so that the flange 72b is biased by the clamping strip to the obtuse radial position shown. It is noted that the lefthand side of the strip 73 abuts the righthand shoulder of the portion 76a to position the righthand edge of the clamping strip properly. In the present instance, the groove 76c positions the outermost end of the base portion 72a in spaced relation to the entering guide portions 76a and the clamping strip 73 is extended beyond the base portion 72a to overlie the open space between the portion 76a and the base of the sealing element 72a. The clamping strip 73 in this space thereby confronts the sheet metal portion of the body at the outer end of the inset zone 71a so as to be susceptible of being spot welded thereto as indicated at 78. This technique insures firm anchoring of the strip 73 with the tubular element 76 and is particularly effective for fabricating connecting pieces of large diameter.

Figure 11:
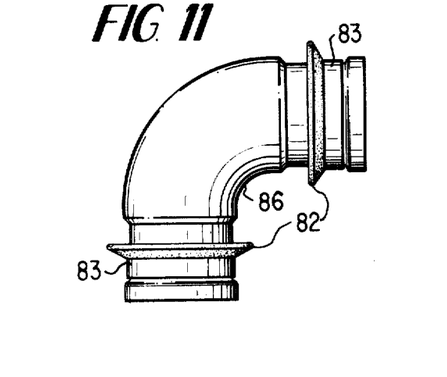
Figure 12:
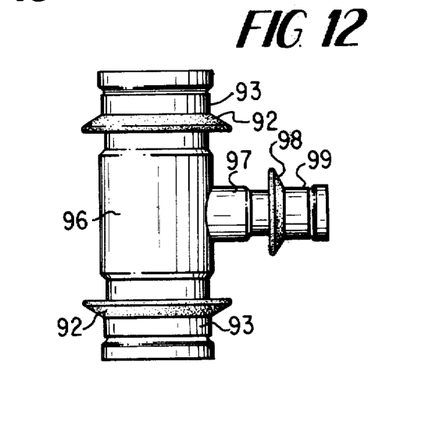

FIGS. 1 and 2 illustrate the joint as comprising a short tubular section as shown in the thumbnail sketch of FIG. 10 and the reference numerals of FIG. 1 having been applied to FIG. 10. The invention is equally applicable to an elbow joint and FIG. 11 illustrates such a joint wherein the tubular body portion 86 has two sealing elements 82 anchored thereon by clamping strips 83. A T-joint is shown in FIG. 12, in the present instance a joint wherein the T connection is of lesser diameter than the main branch. The main branch connector is shown at 96 and is provided with a T branch at 97. Sealing elements 92 are anchored at opposite ends of the branch 96 by clamping strips 93 and a similar sealing element 98 is anchored at the end of the T branch by a clamping strip 99. Preferably in all of these joints, the clamping strip is wedged between the outer guide portion and the sealing flange to provide supplemental bias tending to displace the flange to its obtuse radial position, as shown.

Figures 13A, 13B, 13C:
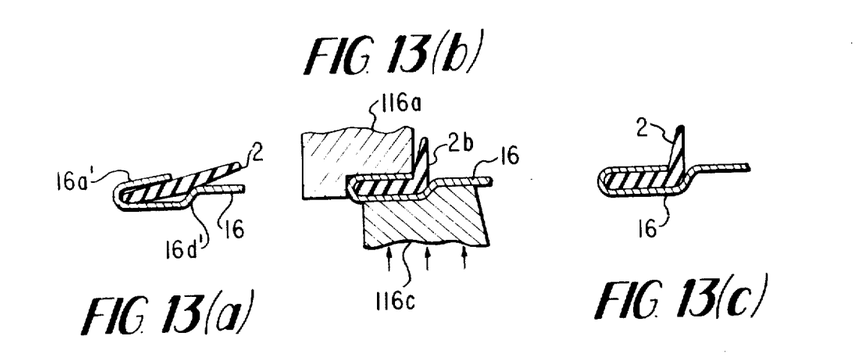
FIGS. 13a, 13b and 13c are views illustrating the formation of the connecting body shown in FIG. 3.

FIGS. 13a–13c illustrate the procedure for biasing the flange 12b in its obtuse angular position as shown in FIG. 3. To this end, the end of the tubular member 16 is preliminarily shaped to receive a sealing element 2, as shown in FIG. 13a, so that the portion of the tubular member 16 is formed with an offset 16d' which will later comprise the shoulder 16d. In like manner, the free end of the tubular portion 16 is bent back as indicated at 16a' to provide a pocket for receiving the sealing element 2. The sealing element 2 is placed within the pocket and is properly positioned by abutting against the base of the lip 16a and forming dies 116a and 116c which are brought into engagement with the tubular body portion 16 to press the sheet metal part into the shape shown and thereby to confine the flange portion 2b of the sealing element 2 into the upright position shown in FIG. 13b. When the entire circumference of the tubular member 16 has been shaped in this manner, the resultant piece is in the form shown in FIG. 13c.

Figure 14A:
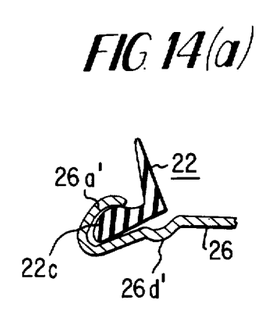
FIGS. 14a, 14b and 14c are views illustrating the formation of the connecting body shown in FIG. 4.
Figure 14B:
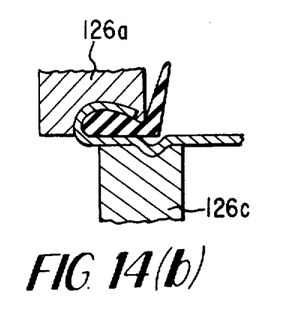
Figure 14C:
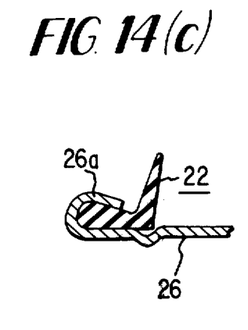

FIGS. 14a–14c illustrate a method of forming a connecting piece similar to that shown in FIG. 4, wherein the tubular element 26 is first grooved as indicated at 26d' and has its free end turned back as indicated at 26a'. A preformed sealing element 22 is placed in the pocket formed by this operation so that the bead 22c on the upper surface of the base portion underlies the turned-back portion 26a' and is properly positioned to cause the flange 22b to be biased to the obtuse radial position shown by the lip 26a. Forming dies at 126a and 126c are then brought into action to form the part as shown in FIG. 14c.

The sealing element may be assembled to the tubular element either prior to fabrication of the tubular element or in the course of fabrication of the tubular element. For small ducts, the sealing element is preferably a continuous circlet circumscribing the preformed sheet metal tubular element and is placed on the element after the element is formed into its final tubular shape. For ducts of large diameter, however, it is effective to use a discontinuous sealing element which is wrapped around the circumference of the duct to bring the opposite ends of the discontinuous sealing element into closely adjoining relation.

In ducts of large diameter, a slight interruption in the seal is tolerated.

Figure 15A:
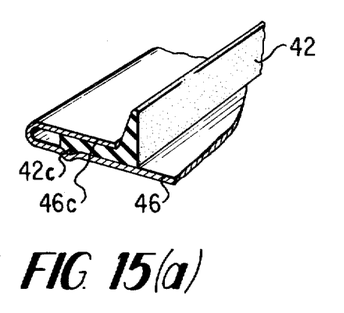
FIGS. 15a and 15b are views illustrating the formation of the connecting body shown in FIG. 6.
Figure 15B:
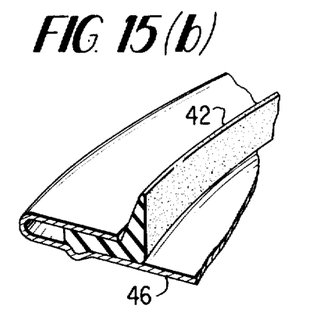

FIGS. 15a and 15b illustrate a procedure for incorporating the sealing element 42 into the tubular element 46 during its fabrication. The tubular element 46 is made from a sheet of material having a width corresponding to the circumference of the cylindrical element and while the width of sheet metal is in flat condition, a transverse groove is formed and the free end of the sheet is turned back. The sealing element of a length similar to the width of the sheet metal is then placed to engage the bead 42c in the groove and end portion 46a is then brought into clamping relationship with the base of the sealing element 42. The sheet metal with the sealing element secured thereto may then be tubulated with the seaming operation performed interiorly to avoid interference with the neat telescopic engagement of the duct runs over the end of the tubular element 46.

Figure 16A:
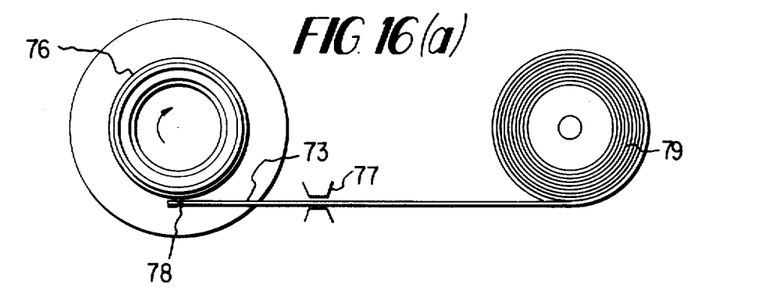
FIGS. 16a, 16b and 16c are schematic illustrations of the method of fabricating the connecting body shown in FIG. 9.
Figure 16B:
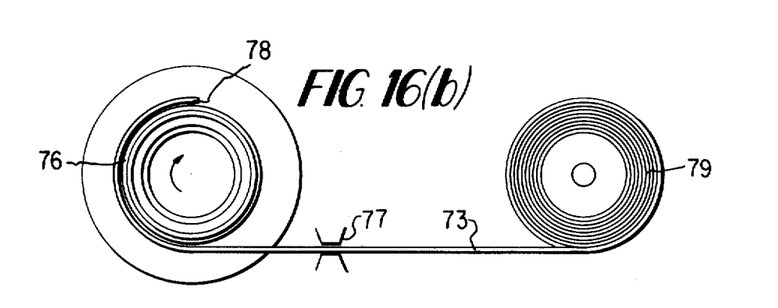
Figure 16C:
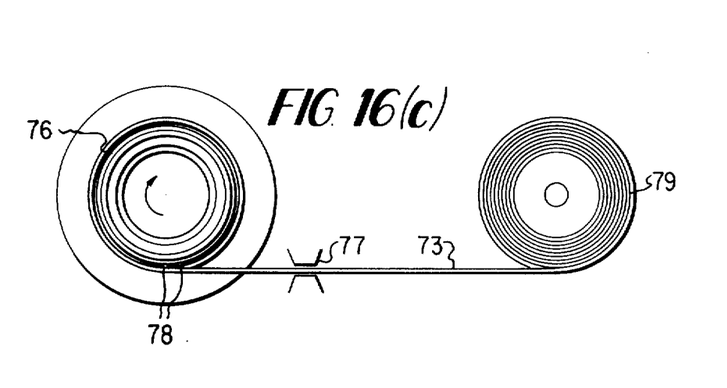

When fabricating the seal of FIG. 9, the separate clamping strip may be wrapped around the circumference of the pipe and to this end, a procedure as diagrammed in FIGS. 16a–16c may be preferred. In this end, the tubular piece 76 is mounted for rotation in a suitable jig and the clamping strip 73 is fed to the tubular member through a brake-tensioner 77 from a supply reel 79. The end of the clamping strip 73 may then be spot welded as indicated at 78 in FIGS. 9 and 16a and then the tubular piece 76 is rotated on its axis to wind the clamping strip 73 about its circumference. It may be preferred to spot weld the strip to the piece 76 at several locations about the circumference and when the strip is completely wound about the circumference of the element 76, the strip is spot welded adjacent the first spot weld at 78 to thereby complete the assembly and provide a firm clamping engagement of the sealing element with the tubular element.

The present invention provides a connection for ductwork which accommodates cylindrical ducts of diameters having wide tolerances. The sheet metal ductwork embodied in ventilating systems is susceptible to distortion by handling during shipment and installation and the present invention provides a seal which is effective with ducts which have such distortions therein. The effectiveness of the seal is enhanced by the additional bias provided to maintain the flange portion of the L-shaped sealing element towards the obtuse radial position at approximately right angles to the base portion. The straight cylindrical inset portion of the tubular member between the inner and outer guiding portions provides a construction which inhibits damage to the sealing element during installation and also enables rotary or angular adjustment of the connecting pieces after the parts have been put together.

It has been found desirable during the manufacture of the duct-connecting joint to position the clamping element relative to the flange of the sealing element so that when the clamping element is securely banded around the base portion, the inner edge of the element engages against the flange and deflects it past the 90° position into a slightly obtuse angular relationship, as shown in the figures.

In the case where the additional bias is provided by the sharp angular corner, the inset zones of the piece from the outer ends of the base portions to the inner guide portions, except for the grooves, whose widths are less than one-tenth of the length of the zone, are straight-wall cylindrical surfaces of uniform diameter throughout, and except for the inwardly projecting beads, the undersurfaces of the base portion of the sealing elements are likewise straight cylindrical surfaces, so that the clamping elements cooperate with the sharp angular corners to position the flanges at the obtuse radial angle greater than 90°.

While various embodiments have been illustrated and described herein, various features and details of the invention may be combined and modified in accordance with the invention as defined in the appended claims.

I claim:

1. A duct-connecting joint for sealingly connecting the open ends of two tubular substantially cylindrical duct runs, said duct joint comprising a substantially cylindrical sheet metal member having a sealing element clamped thereto encircling each end thereof and adapted to be placed between the runs and telescopically engaged within the open ends thereof, the outer surface of said metal member adjacent each of its ends having an outer guide portion at the free axial end of said member, an inner guide portion axially spaced from said outer portion, said outer and inner guide portions having an outside diameter less than the inside diameter of said open ends, and an intermediate inset annular zone for receiving said sealing element, said inset zone throughout its entire length having outside diameter less than the outside diameter of said outer and inner guide portions, each sealing element comprising a circumferential base portion extending axially along the inset zone, and at least one sealing flange portion having an outwardly-directed surface normally projecting outwardly at an obtuse angle to said base portion before the tubular members are telescopically engaged on said metal member and adapted to be deflected inwardly to a larger obtuse angle to said base portion, said sealing flange and base portion respectively having inwardly-directed surfaces meeting at a sharp-angled corner, forming a peak at the outside corner and having biasing means including clamping means for said base portion cooperating with said peak to bias the sealing flange outwardly toward the aforesaid obtuse angular position, said clamping means comprising strip means surrounding said base portion and disposed parallel to said inset zone to cause said base portion to bear against the zone of said metal member to insure effectiveness of said biasing means to urge said flange toward its obtuse radial position, said inset annular zone extending axially a distance corresponding at least to the total length of both the base and flange portions of the sealing element and having a cylindrical seating portion of uniform diameter along the length where it receives the flange portion of said sealing element, said seating portion of said zone terminating at its inner end adjacent said inner guide portion, so that the flange portion may be deflected inwardly to a greater obtuse angle and rest in said inset zone upon the telescoping engagement of the tubular member thereon, said sealing flange when projecting outwardly having an outside diameter greater than the inside diameter of said open ends, and when deflected inwardly having an outside diameter exceeding that of the base portion and the inner guide portion, so as to provide a tight seal about the entire periphery of the sealing flange.

2. A joint according to claim 1 wherein said circumferential clamping strip means has substantially the same axial extension as the base portion of the sealing element, said metal member including a circumferential groove formed in the inset zone opposite to the clamping strip, said strip and groove cooperating to axially position said base portion in the inset zone, the outside diameter of said base and clamping strip being less than that of said flange portion when it is bent inwardly into said inset zone of said duct joint by engagement of the open end of the tubular member thereon.

3. A joint according to claim 1 wherein the circumferential clamping strip means and said outer guide portion are formed by sheet metal of the end portion of the cylindrical member bent back upon itself at the outer axial end of said inset zone to surround said base portion and clamp it to the outer surface of the inset zone and anchor said sealing element in said inset zone, the outside diameter of said double bent end portion being less than that of said flange portion when it is bent inwardly into said inset zone by engagement of the open end of the tubular member thereon.

4. A joint according to claim 1 wherein said inner guide portion comprises a cylindrical portion of expanded diameter defining a continuous shoulder.

5. A joint according to claim 1 wherein said inner guide portion comprises a line of outstanding warts extending circumferentially of said sheet metal member.

6. A joint according to claim 1 wherein said cylindrical seating portion of said zone terminates adjacent said sharp-angled corner in a groove to receive said peak when said flange is deflected toward said seating portion.

7. A duct-connecting joint for sealingly connecting to the open end of a tubular substantially cylindrical duct run, said duct joint comprising a substantially cylindrical sheet metal member having a sealing element clamped thereto encircling the end thereof and adapted to be telescopically engaged within the open end of the duct run, the outer surface of said sheet metal member having an inset annular zone for receiving said sealing element, said sealing element comprising a circumferential base portion, extending axially along the inset zone, and at least one sealing flange portion normally projecting outwardly at an obtuse angle to said base portion before the tubular members are telescopically engaged and adapted to be deflected inwardly to a larger obtuse angle to said base portion, said sealing element being pre-formed with the inwardly-directed surfaces of the sealing flange and the base portion meeting at a sharp angle forming a peak on the outside corner of the sealing element, said inset zone along the length where it receives said deflected flange having a straight cylindrical seating portion of uniform diameter, said inset zone along the length where it receives said base portion having a straight cylindrical clamping portion of uniform diameter, said inset zone intermediate said seating portion and said clamping portion having a groove underlying said peak and adapted to receive said peak when said flange is deflected into said seating portion of the inset zone, said clamping portion of the inset zone terminating at its outer end in a reversely bent lip overlying said clamping portion and said base portion and abutting said sealing flange at its junction with the base portion to bias said flange into an obtuse projecting position.

8. A joint according to claim 7 wherein said base portion of the sealing element has a bead projecting therefrom and said sheet metal member has means forming an abutment to engage said bead and thereby position said base portion relative to said lip to insure proper abutment of said lip with said flange.

9. A duct-connecting joint for sealingly connecting to the open end of a tubular substantially cylindrical duct run, said duct joint comprising a substantially cylindrical sheet metal member having a sealing element clamped thereto encircling the end thereof and adapted to be telescopically engaged within the open end of the duct run, the outer surface of said sheet metal member having an inset annular zone for receiving said sealing element, said sealing element comprising a circumferential base portion, extending axially along the inset zone, and at least one sealing flange portion normally projecting outwardly at an obtuse angle to said base portion before the tubular members are telescopically engaged and adapted to be deflected inwardly to a larger obtuse angle to said base portion, said sealing element being preformed with the inwardly-directed surfaces of the sealing flange and the base portion meeting at a sharp angle forming a peak on the outside corner of the sealing element, said inset zone along the length where it receives said deflected flange having a straight cylindrical seating portion of uniform diameter, said inset zone along the length where it receives said base portion having a straight cylindrical clamping portion of uniform diameter, said inset zone intermediate said seating portion and said clamping portion having a groove underlying said peak and adapted to receive said peak when said flange is deflected into said seating portion of the inset zone, a clamping strip circumscribing said clamping portion and said base portion, and means to relatively position said strip and said base portion relative to said groove to bias said flange into said obtuse radial position.

10. A duct-connecting joint for sealingly connecting to the open end of a tubular substantially cylindrical duct run, said duct joint comprising a substantially cylindrical sheet metal member having sealing element clamped thereto encircling the end thereof and adapted to be telescopically engaged within the open end of the duct run, the outer surface of said sheet metal member having an inset annular zone for receiving said sealing element, said sealing element comprising a circumferential base portion, extending axially along the inset zone, and at least one sealing flange portion normally projecting outwardly at an obtuse angle to said base portion before the tubular members are telescopically engaged and adapted to be deflected inwardly to a larger obtuse angle to said base portion, said inset zone along the length where it receives said deflected flange having a straight cylindrical seating portion of uniform diameter, said inset zone along the length where it receives said base portion having a straight cylindrical clamping portion of uniform diameter, said inset zone terminating at its outer end in a continuous divergent shoulder projecting outwardly from said inset zone, said sheet metal member beyond of said zone providing an outer guide portion, a separate clamping strip circumscribing said base and overlying said clamping portion and said base portion, and means on said base portion and said member to position said sealing element relative to said shoulder to wedge said separate clamping strip between said shoulder and said sealing flange at its junction with the base portion to bias said flange into an obtuse radial position.

11. A joint according to claim 10 wherein said base portion is spaced from said shoulder and said clamping strip is welded to said sheet metal member in said inset zone in the space between said base portion and said shoulder.

12. A joint according to claim 11 wherein said sealing element is pre-formed with the inwardly-directed surfaces of the sealing flange and the base portion meeting at a sharp angle forming a peak on the outside corner of the sealing element opposite the position where the strip abuts the flange to additionally bias the flange into its obtuse radial position.

13. A joint according to claim 10 wherein said inset zone intermediate said seating portion and said clamping portion has a groove underlying the inner end of said sealing element at the junction of said base and flange portions.

14. A duct-connecting joint for sealingly connecting to the open end of a tubular substantially cylindrical duct run, said duct joint comprising a substantially cylindrical sheet metal member having a sealing element clamped thereto encircling the end thereof and adapted to be telescopically engaged within the open end of the duct run, the outer surface of said metal member having an inset annular zone for receiving said sealing element, said sealing element comprising a circumferential base portion, extending axially along the inset zone, and at least one sealing flange portion normally projecting outwardly at an obtuse angle to said base portion before the tubular members are telescopically engaged and adapted to be deflected inwardly to a larger obtuse angle to said base portion, said sealing element being pre-formed with the inwardly-directed surfaces of the sealing flange and the base portion meeting at a sharp angle forming a peak on the outside corner of the sealing element to bias the flange into its obtuse radial position, said inset zone along the length where it receives said deflected flange having a seating portion to receive said deflected flange, said inset zone along the length where it receives said base portion having a clamping portion, said clamping portion of the inset zone terminating at its outer end in an outer guide portion, said inset zone having a circumferential groove intermediate said seating portion and said clamping portion, clamping means circumscribing said base and overlying said clamping portion and said base portion, and interengaging means on said base portion and said member to position said sealing element relative to said clamping means and relative to said circumferential groove to abut said flange against said clamping means and to position said peak in registry with said circumferential groove so that when the flange is deflected into said seating portion, said peak is received in said groove.

* * * * *